(12) United States Patent
Perera et al.

(10) Patent No.: US 11,456,457 B2
(45) Date of Patent: Sep. 27, 2022

(54) METHOD AND SYSTEM FOR AROMATIC MACROCYCLIC COMPOUNDS (PHTHALOCYANINES) AS CATHODE ADDITIVES FOR INHIBITION OF TRANSITION METAL DISSOLUTION AND STABLE SOLID ELECTROLYTE INTERPHASE FORMATION

(71) Applicant: Enevate Corporation, Irvine, CA (US)

(72) Inventors: Sanjaya D. Perera, Irvine, CA (US); Liwen Ji, San Diego, CA (US); Jeremy Chang, Irvine, CA (US); Benjamin Park, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 118 days.

(21) Appl. No.: 16/833,123

(22) Filed: Mar. 27, 2020

(65) Prior Publication Data

US 2021/0305560 A1    Sep. 30, 2021

(51) Int. Cl.
| | |
|---|---|
| *H01M 4/525* | (2010.01) |
| *H01M 4/60* | (2006.01) |
| *H01M 10/054* | (2010.01) |
| *H01M 4/46* | (2006.01) |
| *H01M 4/62* | (2006.01) |
| *H01M 10/052* | (2010.01) |
| *H01M 4/131* | (2010.01) |
| *H01M 4/134* | (2010.01) |
| *H01M 4/38* | (2006.01) |
| *H01M 10/0525* | (2010.01) |
| *H01M 4/02* | (2006.01) |

(52) U.S. Cl.
CPC ......... *H01M 4/525* (2013.01); *H01M 4/131* (2013.01); *H01M 4/134* (2013.01); *H01M 4/386* (2013.01); *H01M 4/463* (2013.01); *H01M 4/60* (2013.01); *H01M 4/62* (2013.01); *H01M 4/625* (2013.01); *H01M 10/052* (2013.01); *H01M 10/054* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2014/0072879 A1 | 3/2014 | Chen et al. | |
| 2019/0181491 A1 | 6/2019 | Park et al. | |

FOREIGN PATENT DOCUMENTS

| | | | |
|---|---|---|---|
| CN | 102263310 | * | 11/2011 |
| CN | 103782440 | * | 2/2014 |
| JP | 2009-283411 | * | 12/2009 |
| JP | 20090283411 A | | 12/2009 |

OTHER PUBLICATIONS

International Search Report of PCT/US2021/021607 dated May 19, 2021, 17 pages.

* cited by examiner

*Primary Examiner* — Laura Weiner
(74) *Attorney, Agent, or Firm* — McAndrews, Held & Malloy, Ltd.

(57) ABSTRACT

Systems and methods for aromatic macrocyclic compounds (Phthalocyanines) as cathode additives for inhibition of transition metal dissolution and stable solid electrolyte interphase formation may include an anode, an electrolyte, and a cathode, where the cathode comprises an active material and a phthalocyanine additive, the additive being coordinated with different metal cationic center and functional groups. The active material may comprise one or more of: nickel cobalt aluminum oxide, nickel cobalt manganese oxide, lithium iron phosphate, lithium cobalt oxide, and lithium manganese oxide, Ni-rich layered oxides $LiNi_{1-x}M_xO_2$ where M=Co, Mn, or Al, Li-rich $xLi_2MnO_3(1-x)LiNi_aCo_bMn_cO_2$, Li-rich layered oxides $LiNi_{1+x}M_{1-x}O_2$ where M=Co, Mn, or Ni, and spinel oxides $LiNi_{0.5}Mn_{1.5}O_4$. The phthalocyanine additive may include one or more of: cobalt hexadecafluoro phthalocyanine (Co-Pc-F), dilithium phthalocyanine (Li-Pc), cobalt(II) phthalocyanine, nickel(II) phthalocyanine-tetrasulfonic acid tetrasodium salt, titanium (IV) phthalocyanine dichloride, manganese(II) phthalocyanine, zinc phthalocyanine, aluminum phthalocyanine chloride, Iron(II) phthalocyanine, and silicon phthalocyanine dichloride.

13 Claims, 9 Drawing Sheets

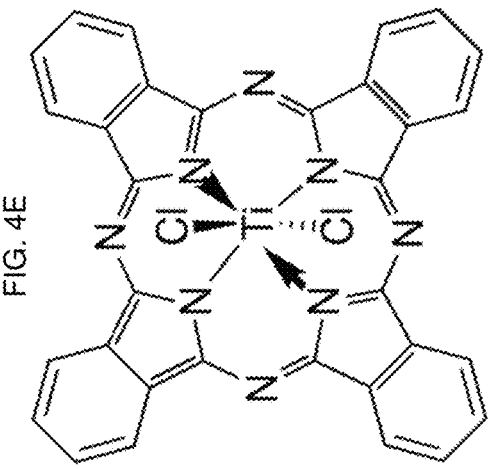
FIG. 4E Titanium(IV) phthalocyanine dichloride
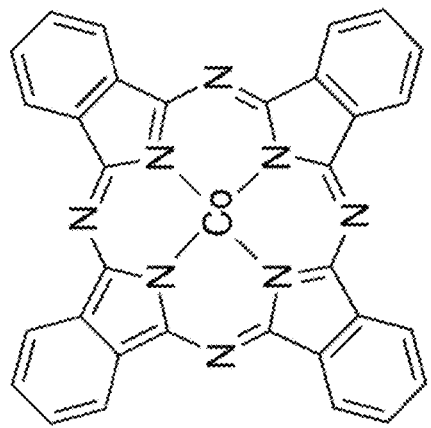
FIG. 4C Cobalt(II) phthalocyanine
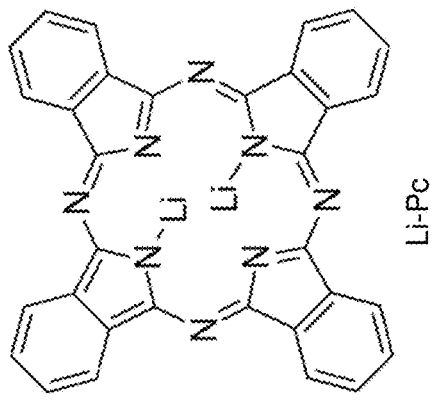
FIG. 4B Li-Pc
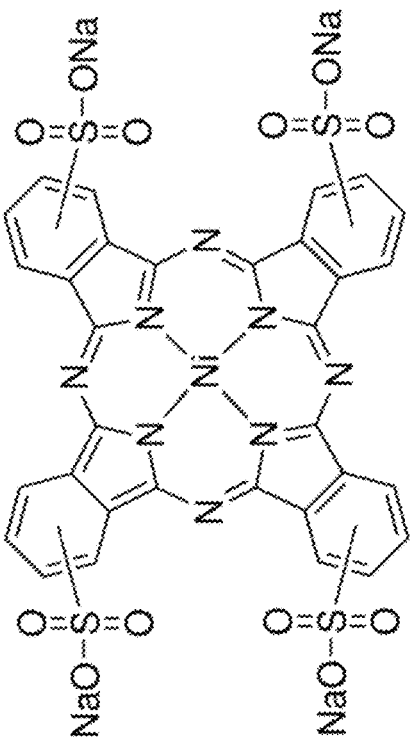
FIG. 4D Nickel(II) phthalocyanine-tetrasulfonic acid tetrasodium
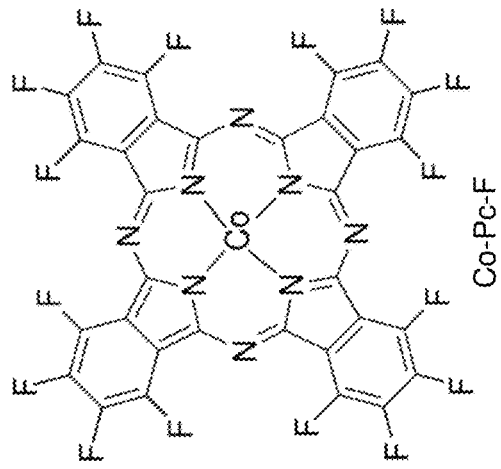
FIG. 4A Co-Pc-F

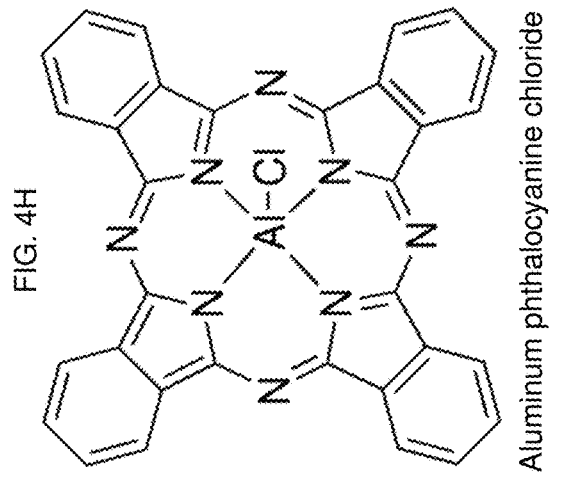
FIG. 4H Aluminum phthalocyanine chloride
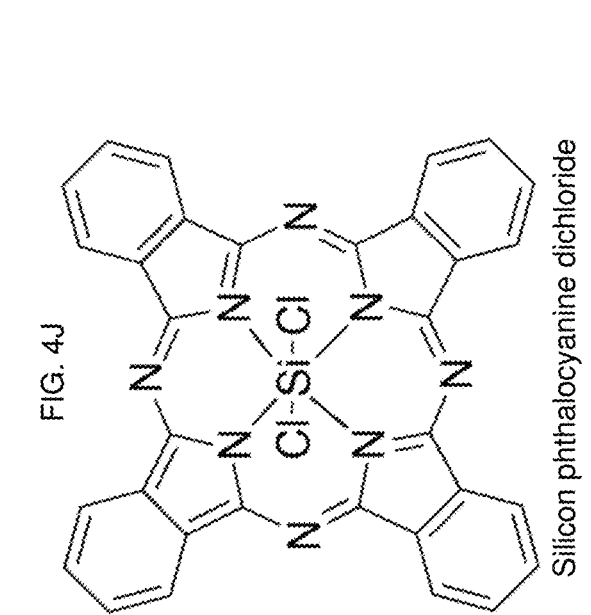
FIG. 4J Silicon phthalocyanine dichloride
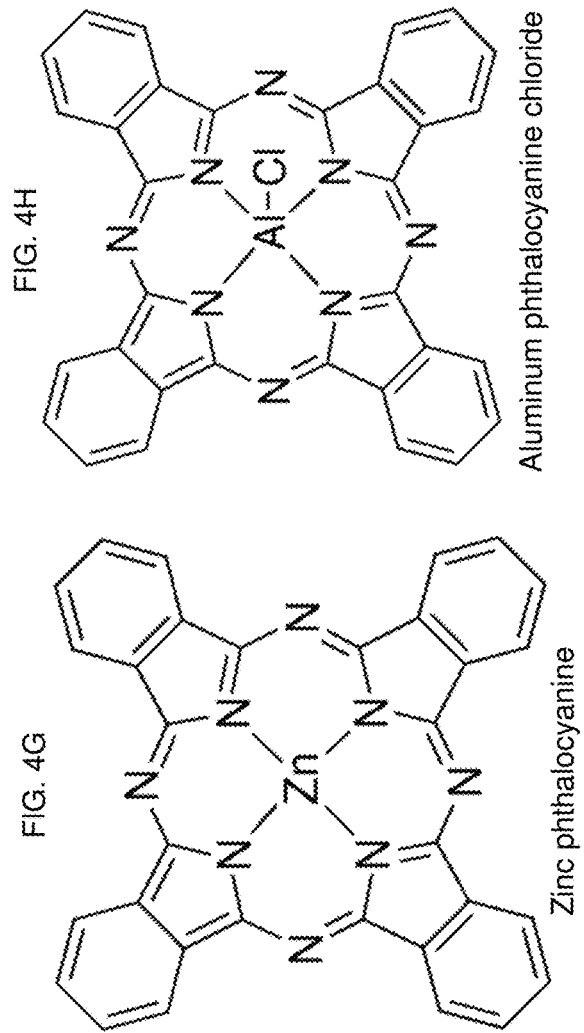
FIG. 4G Zinc phthalocyanine
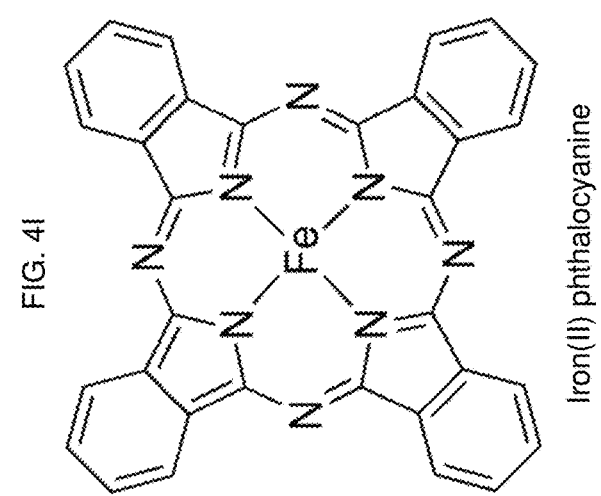
FIG. 4I Iron(II) phthalocyanine
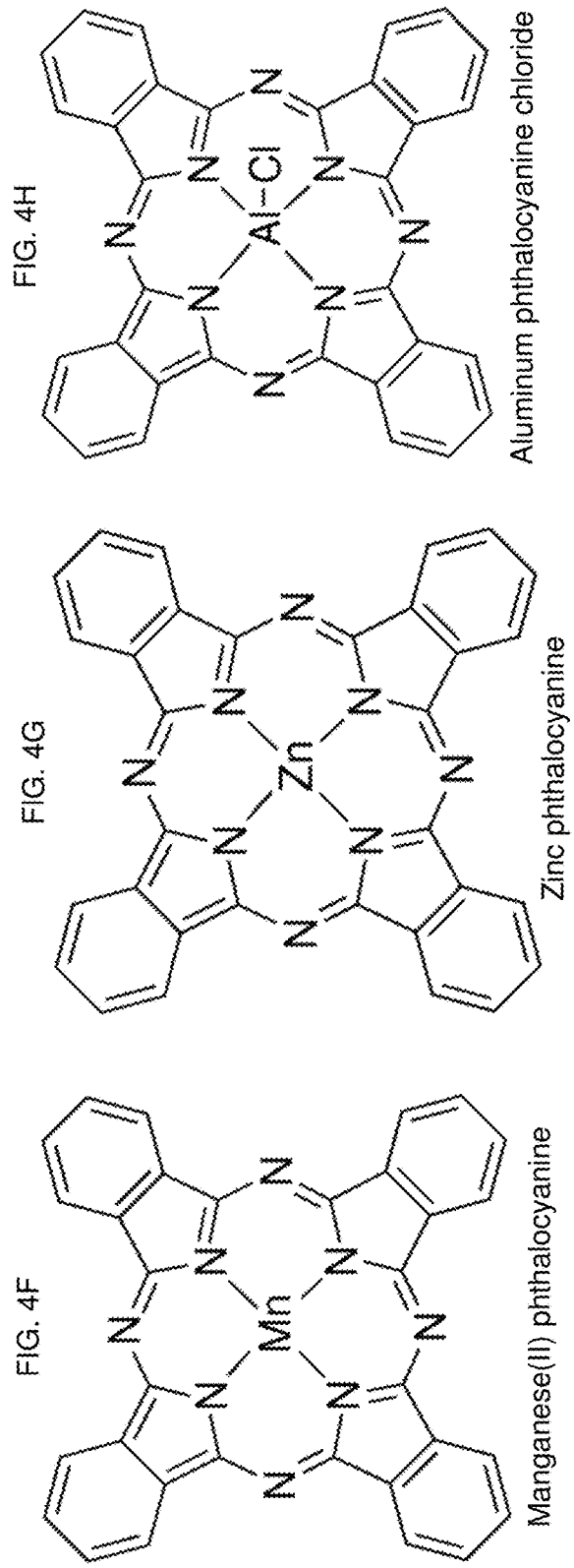
FIG. 4F Manganese(II) phthalocyanine

METHOD AND SYSTEM FOR AROMATIC MACROCYCLIC COMPOUNDS (PHTHALOCYANINES) AS CATHODE ADDITIVES FOR INHIBITION OF TRANSITION METAL DISSOLUTION AND STABLE SOLID ELECTROLYTE INTERPHASE FORMATION

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for aromatic macrocyclic compounds (phthalocyanines) as cathode additives for inhibition of transition metal dissolution and stable solid electrolyte interphase formation.

BACKGROUND

Conventional approaches for battery cathodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for aromatic macrocyclic compounds (phthalocyanines) as cathode additives for inhibition of transition metal dissolution and stable solid electrolyte interphase formation, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 4A-4J illustrate molecular structures of example phthalocyanine additives that may be utilized in cathodes, in accordance with an example embodiment of the disclosure.

DETAILED DESCRIPTION OF THE INVENTION

Figure 1:
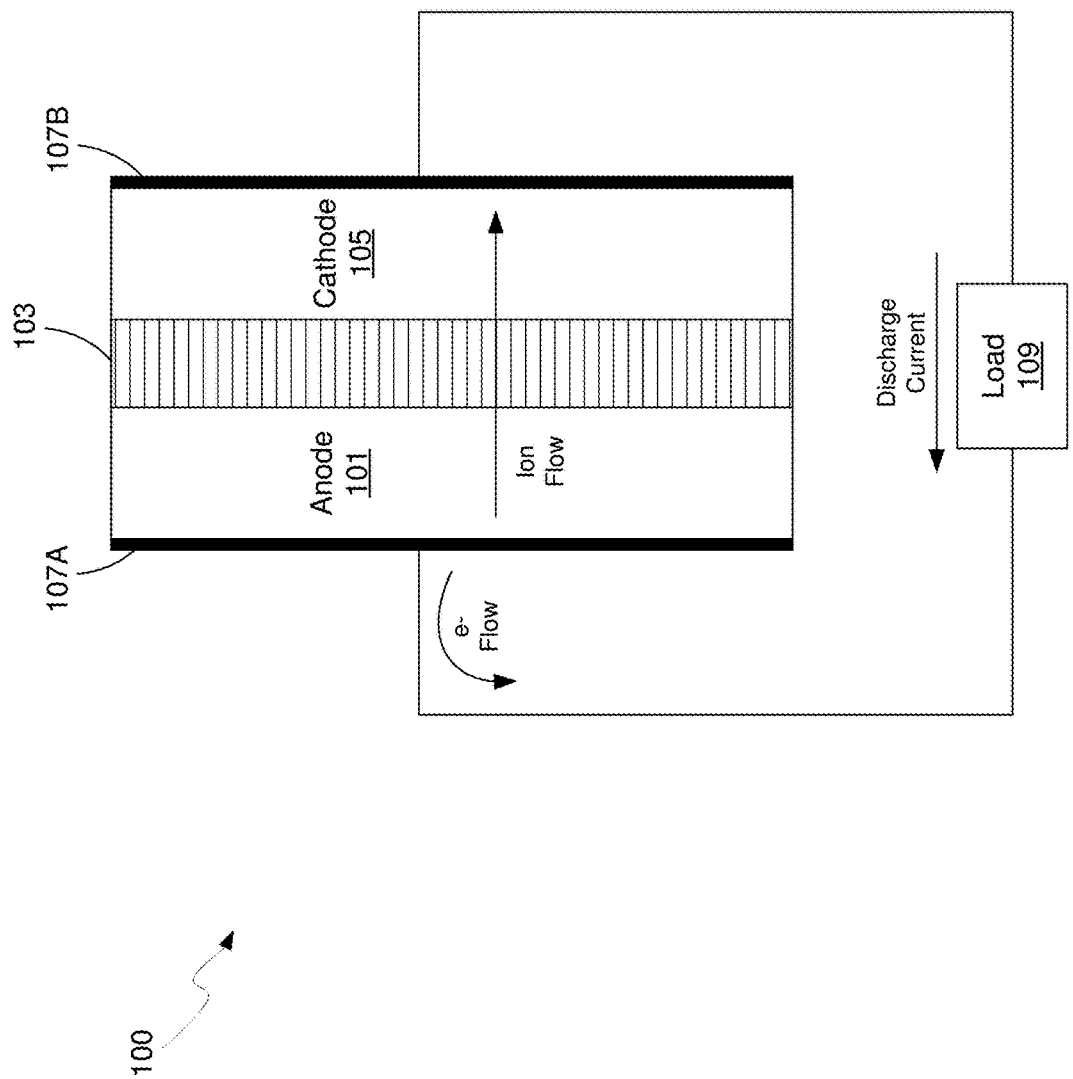
FIG. 1 is a diagram of a battery, in accordance with an example embodiment of the disclosure.

FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 1078, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), di-fluoroethylene carbonate (DiFEC), trifluoropropylene carbonate (TFPC), vinyl carbonate (VC), Propylene Carbonate (PC), Dimethyl Carbonate (DMC), Ethyl Methyl Carbonate (EMC), Diethyl Carbonate (DEC), etc. with dissolved lithium hexafluorophosphate (LiPF$_6$), lithium tetrafluoroborate (LiBF$_4$), lithium hexafluoroarsenate monohydrate (LiAsF$_6$), lithium perchlorate (LiClO$_4$), lithium bis(trifluoromethanesulfonyl) imide (LiTFSI), lithium bis(fluorosulfonyl)imide (LiFSI), lithium difluoro(oxalate)borate (LiDFOB), lithium bis(oxalato)borate (LiBOB), and lithium triflate (LiCF$_3$SO$_3$), lithium tetrafluorooxalato phosphate (LTFOP), lithium difluorophosphate (LiPO$_2$F$_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB) and lithium 2-fluorophenol trimethyl borate (LFPTB), lithium catechol dimethyl borate (LiCDMB), etc.

The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g at high temperature and 3579 mAh/g at room temperature. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), graphite, graphene, etc., and/or a mixture of these have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Among all the potential cathode active materials, Ni-rich NCA (Nickel cobalt aluminum oxide) and NCM (Nickel Cobalt Manganese Oxide) are considered to be most promising. Ni-rich NCA or NCM cathodes show excellent thermodynamic stability and specific capacity as high as 200 mAh/g. Although NCA or NCM are best known for long-term stability and high energy density, they have also been shown to be problematic due to poor cycle stability and low electronic conductivity.

It is generally believed that the capacity of the cathode materials is one of the major limiting factors for the energy density of Li-ion batteries. Therefore, Ni-rich cathode materials (such as NCA, NCM) and Li-rich layered oxide cathode materials have been considered and explored as the possible future choices because of their high specific capacity and low cost. These materials are especially useful if they can be coupled with high capacity and low-voltage anode materials, such as Si. However, these cathode materials have some fundamental challenges, such as irreversible phase transition from hexagonal through cubic to rock salt structure, mechanical cracking of the secondary particle structure, electrolyte depletion that is often accompanied by impedance increase and volumetric swelling of the batteries, as well as gelation of cathode slurry in the slurry-making process.

From the cathode side, a number of strategies may be utilized to overcome these issues, such as cation doping for stabilizing the cathode material lattice structure, surface coating for protecting cathode particles from parasitic reactions with the electrolyte components, synthesizing concentration-gradient or core-shell structures with high Ni content core for stabilizing the material's surface chemistry, as well as using electrolyte additives for chemically trapping released oxygen.

Without negative impacts on the anode, electrolyte, and the battery manufacturing procedures or design, incorporating a cathode additive is an efficient, cost-effective and practically feasible strategy to overcome the issues with layered cathode materials and to improve the full cell performance.

Commercial Li-ion batteries are based on graphite anode layered metal oxide cathodes, particularly Ni-rich $LiMO_2$ (M-Ni, Co, Mn). Layered $Li[Ni_xCo_y(Al \text{ or } Mn)_{1-x-y}]O_2$ (Al=NCA or Mn=NCM) materials have been the most promising cathode materials used for EVs, as evidenced by an automobile manufacturer adopting an NCA cathode, $Li[Ni_{0.8}Co_{0.15}Al_{0.05}]O_2$, in its current model cars. High Ni content cathodes (NCM and NCA) that can provide high capacity (180-200 mAh/g) have become the fastest developing commercial cathode for EVs in recent years. However, their thermal instability on de-lithiation due to the presence of the high-valance Ni raises safety concerns for Li-ion cells. These cathodes also have some issues with metal dissolution which this disclosure addresses/solves. Compared to Ni-rich cathodes, olivine LiFePO4 electrodes are significantly more stable to lithium extraction, but their low capacities (100-150 mAh/g) limit their use in EVs. Additionally, manganese-rich cathodes with $LiMO_2$ (M=Mn, Ni, Co) formula has been intensively tested as a potential cathode material for EVs due to the excess lithium in these composites being able to boost the specific capacity of the cell up to 250 mAh/g. However, severe capacity fading after long-term cycling of these high energy cathodes should generally be addressed before they are adopted in advance future EVs.

The dissolution/degradation mechanisms of layered Ni and Mn-rich layered oxide in Li-ion batteries has been neither completely eliminated nor fully understood. Several challenges of Ni-rich layered materials may need to be overcome before the full potential of these cathode materials are realized. Dissolution of transition metals (TMs) from Ni-rich cathode materials and their deposition on Si anodes, microstructural changes and grain boundary cracking of cathode microparticles contribute to capacity fade and unsatisfactory cycle life. Commercial EV applications require Li-ion batteries that can provide stable cycling with minimum capacity fades at elevated temperatures. Poor cycle performance of conventional cathodes due to the high rate of cation dissolution and formation of microcracks at elevated temperature (45 to 60 Degrees C.) limits the practical application of Li-ion batteries in EVs.

In addition, the nominal upper cutoff voltage of layered structures is ~4.0-4.2 V. An increase in the upper cutoff voltage of such materials results in the higher capacity fade of the cathode. Thus, new and improved cathode materials with modified chemical compositions or novel additives that can suppress inherent instability of layered Ni-rich cathode materials are desired to meet the ever-growing demand for high energy density, long cycle life, and cost-effective Li-ion batteries.

In this disclosure, the incorporation of novel macromolecular additives to cathodes may provide advantages such as: (a) an increase in capacity and long-term stability; (b) a decrease in the dissolution of transition metal cations; (c) the incorporation of fluorine anions ($F^-$) simultaneously can potentially enhance the performance of a Si anode by transferring to the anode through the electrolyte; and (d) these materials can be introduced to an existing cathode manufacturing process.

A challenge with transition metal-based cathodes is capacity fade and power fading, especially at elevated temperatures and high cathode potential due to the dissolution-migration-deposition (DMD) of transition metals. This dissolution process of transition metals changes the surface of the cathode and affects the formation of SEI composition at the anode. Among different cathode materials Ni-containing cathodes provide high capacity (170-190 mAh/g for NCA). However, Ni and Mn ions are dissolved from the cathode and migrate through the electrolyte and deposit onto the anode. In Mn-rich cathodes, the phase transformation is directly related to the Mn dissolution from the cathode at high potentials. Additionally, chemical lithiation and protonation also contribute to Mn dissolution, which is demonstrated by the formation of a Mn-deficient $\lambda Li_xH_yMnO_2$ phase.

Since most of this cation dissolution takes place at the interface between the cathode and electrolyte, stabilizing the cathode structure against parasitic reactions with the electrolyte may improve cycle life. The morphology and chemistry of cathode materials may be configured by adjusting the parameters for synthesis, annealing temperature, and Li ion precursor. However, Mn-rich spinel still suffers from Mn dissolution and further efforts are required to solve Mn dissolution and subsequent capacity fade.

The transition metal cation dissolution-migration-deposition (DMD) process may be directly correlated with capacity fading of a battery over long term cycling. DMD and the formation of grain boundaries initiated by; (i) transition metal cation dissolution (ii) migration of dissolved cations through the electrolyte (iii) decomposition/reaction with the anode SEI. Poor long-term cycling of transition metal-based cathode materials at a higher voltage or elevated temperature leads to structural changes and may form grain boundaries. These grain boundaries cause the exposure of cathode active material to the electrolyte and create a thick insulating layer, which results in an increase in cell resistance. Additionally, this process not only changes the surface and the structure of the cathode but also catalyzes the electrolyte decomposition, which generates gasses and corrosive by-products that can further catalyze the SEI decomposition reactions and oxidize the electrolyte, especially at elevated temperatures. These bi-products form a thick cathode electrolyte interphase (CEI) film on the surface of the cathode particles and impedes Li-ion diffusion. Although the capacity fading mechanisms of graphite-based Li-ion batteries have been widely investigated, the effect of capacity fading of cathodes when coupled with high content Si anodes has not been fully realized.

Although transition metal ion dissolution differs depending on the metal (Mn>Co>Ni), Ni dissolution at high cathode potential and at elevated temperature is often observed and one of the contributors for capacity fading. The capacity loss of the cathode may be mainly due to: (i) continuous surface exposure of the cathode to the electrolyte due to particle cracks; (ii) widening of the transition metal-O bond length due to oxygen loss; and (iii) phase transformation of cathode material at de-lithiation, which overall results in increasing cell impedance.

Several approaches may address these challenges associated with the cathode performance: (i) coating the surface of cathode particles to improve the stability and minimize the continuous exposure of the cathode to the electrolyte; (ii) additive ions with specific absorption to the surface of the metal; (iii) introducing stable electrolytes that are less prone to decomposition (iv) doping Ni-rich cathodes; (v) pre-lithiation of cathode materials; and (iv) introducing electrolyte additives to stabilize the electrode/electrolyte interphase (SEI layer). Electrolyte additives, such as butylamine, N,N-dicyclohexylcarbmiimide, amino and trimethylsilane can also suppress or prevent the Mn dissolution by scavenging water and HF impurities in the electrolyte. Some organic and inorganic ligands, such as cyclic ethers and $NH^{4+}$ also may lower the chemical activity of $Mn^{2+}$.

Coating of the cathode with metal oxides or carbon has shown some improvement in electrochemical stability. These coatings act as a barrier for propagating corrosive reactions of cathode particles with electrolytes. Carbon coating can improve the conductivity of cathode particles and Li-ion diffusion. However, a thicker coating results in a trade-off between structural stability and performance due to poor lithium-ion diffusion and lower Coulombic efficiencies. Different cations or substitution atoms, such as Mo, Al, Mg, Ti, V, Nb may be incorporated in Ni- and Mn-rich cathode materials to improve cyclability. Most of these doping processes may provide a minor effect on charge-discharge curves but improved cycle life. Incorporation of the larger guest cations can enlarge the interlayer spacing of the cathode structure, thereby improving the Li-ion diffusion. Although, the introduction of additives to electrolytes that can stabilize the anode SEI as well as minimize the side reactions between SEI and the electrolyte, the solubility of these salts is limited and do not provide a significant boost in the cathode performance.

While the incorporation of guest materials in the electrolyte is the most common approach, the behavior of these additives can be significantly different compared to directly localizing them within the electrodes. Direct mixing of additives that has multifunctional features to the cathode can address several challenges associated with the cathode and anode simultaneously. In this disclosure, phthalocyanine may be incorporated, which has an aromatic macrocyclic structure with a range of cationic centers as an additive in the cathode electrode. Due to the vast and diverse nature of this highly conjugated macromolecular compound, the present disclosure utilizes unique functional groups and cationic centers that may be particularly attractive for addressing transition metal dissolution and improving the cycle life of Li-ion batteries. As a result, the incorporation of phthalocyanines within the cathode may stabilize the electrodes and extend the cycle life of Li-ion batteries and provide an opportunity to further enhance the electrochemical performance of Ni and Mn-rich cathodes.

Phthalocyanine is a large ring complex with 18-π electrons with a metal cation center. Due to their excellent physical and chemical stability, special skeleton structure, unique electrochemical properties, phthalocyanine based materials are good candidates for electrochemical energy storage applications. Phthalocyanine is a planar aromatic macrocyclic molecule that shows bipolar features of donating or accepting electrons. The highly stable C—N bonds in their frameworks can endow them with high reversible capacity in a wide voltage window. Additionally, their 18 π-electrons can be oxidized or reduced into 16 or 20 electrons.

There are specific advantages of phthalocyanines that make them beneficial; (i) Metal-free phthalocyanine and metal phthalocyanine (MPc) derivatives are known to form a stacked-layer structure that can promote intercalation reactions; (ii) Pc and its derivatives have a phthalocyanine ring that can act as a site for lithium-ion intercalation, making them an ideal candidate for electrode materials; (iii) density functional theory (DFT) calculations have been applied to study the mechanism of Li atom intercalation showing that the FePc molecular crystal enables intercalation capacities of about 37 Li-ions at a low voltage; and (iv) Small HOMO-LUMO gaps can effectively promote facile injection and removal of electrons, resulting in fast redox kinetics. These unique properties of Pc may be beneficial for improving charge transfer kinetics.

In addition, the highly stable C—N bonds in their frameworks can endow them with a high reversible capacity and large working voltage. Phthalocyanine and metal phthalocyanine (MPc) derivatives have the strong adsorption capability toward soluble transition metal ions from Ni-rich NCM or NCA cathodes. Therefore, phthalocyanines can act as a transition metal cation scavenger to prevent transition metal cation migration. Moreover, coordination bonds that can form between phthalocyanine ring structure and metal cations within cathode can lower the rate of metal cation dissolution. Both these mechanisms can promote the improvement in the electrochemical performance of Ni-rich cathode materials. The current disclosure comprises functionalizing Pc with various functional groups that are favorable for Li-ion battery performance.

Some electrolyte additives such as 4-(perfluorooctyl)-1, 3-dioxolan-2-one (PFO-EC), tris(1,1,1,3,3,3-hexafluoropropan-2-yl) phosphate (HFiP) and thiophene derivatives form stable cathode-electrolyte interphase (CEI) so that cathode materials can suppress the reactions with the electrolyte. Fluorination of metal oxides can protect the surface of the cathode from HF attacking by eliminating H2O and —OH groups on the cathode material surface.

The disclosure also comprises the fabrication of the cathode with fluorinated phthalocyanines, where all —H groups on the ring structure are substituted with fluorine groups. Since the fluoride ions have more significant interaction with the Li+ ions than the oxide ion, the metal-F bonds at the surface of the cathode material promote the Li ion transfer at the interface of the active material and the electrolyte. Adding fluoro-organic compounds to the starting slurry mixture can influence the crystal orientation and the morphology of the sample. Although it may not be clear whether the fluoride ions are substituted or not for an oxide ion, incorporation of fluorine would be beneficial for protecting the cathode surface. Additionally, incorporation of Li substituted phthalocyanines can also provide unique coordination chemistry with transition metals in cathode active material.

This disclosure covers multi-functional cathode additives that can be absorbed onto metal cations and act as metal cation scavengers. The cathode additives comprise favorable functional groups and may be easy to integrate in a commercial manufacturing process. This may comprise the incorporation of macrocyclic compounds to the cathode material as an additive to the cathode slurry. Although these additives may be used in electrolytes, the limited solubility of the macromolecules in the electrolytes limits the positive effects due to the low percentage that could be incorporated compared to using them in electrodes. This disclosure introduces multifunctional cyclic phthalocyanines coordinated with metal cationic center and functional groups directly to the cathode. The functional groups may be electrochemically active or inactive. The material may be introduced to the cathode and some of the material may dissolve into the electrolyte as needed or desired, or the electrolyte could have already incorporated these materials.

In another example embodiment, two-dimensional phthalocyanine molecules may be bound to a conductive graphene layer to act as a cathode material. The conductivity of this reduced graphene oxide/Fe-phthalocyanine (rGO/FePc) composite is improved through good interfacial connections and internal polymerization. The electrochemical properties of the organic-inorganic composites may be demonstrated by testing in a lithium-ion cell. A high discharge capacity of 186 mAh/g is demonstrated after 100 cycles at 300 mA/g. Active transition-metal phthalocyanine compounds may be used as electrocatalysts, organic anode materials, in Li-air cells, and in Li—S batteries.

In an example embodiment, the incorporation of highly conjugated aromatic macrocyclic compounds to conventional cathode slurries is disclosed. In addition, aromatic macrocyclic compounds conjugate with cathode active materials that are capable of intercalating/de-intercalating Li+ ions, Li-transition metal oxides, lithium manganese oxide, and layered structures comprises of Ni, Mn, Co or Fe. Functional groups of these cyclic macromolecules provide unique benefits for improving the cathode and/or anode performance. Some of the macromolecules would be able to affect the anode through dissolution into the electrolyte in the case of a liquid electrolyte. These may provide a sandwich layered structure around cathode particles and shorten the Li ion transport path between particle-particle/particle-current collector.

Figure 2:
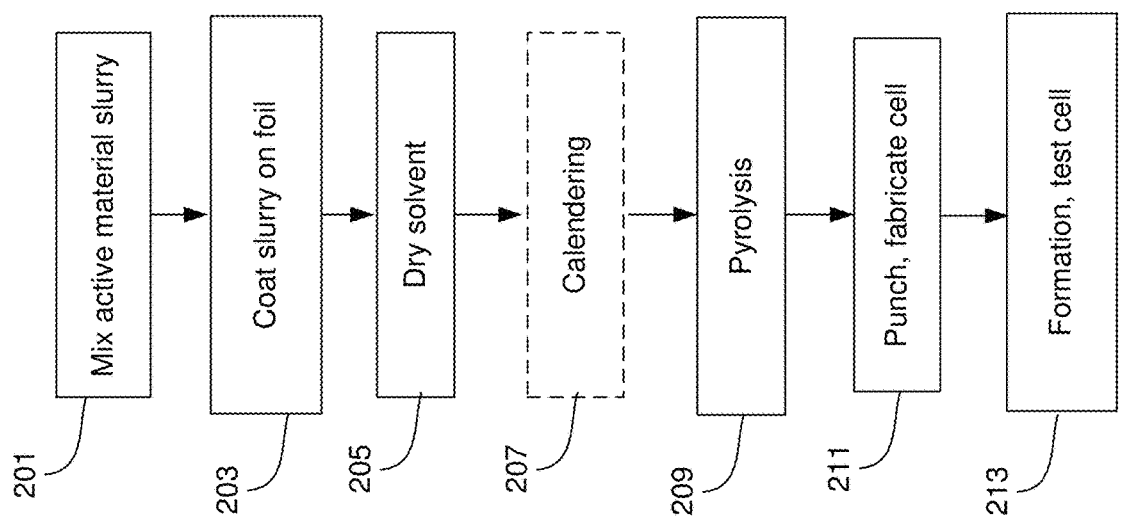
FIG. 2 is a flow diagram of a direct coating process for forming a cell with phthalocyanine additive cathode, in accordance with an example embodiment of the disclosure.

FIG. 2 is a flow diagram of a direct coating process for forming a cell with phthalocyanine additive cathode, in accordance with an example embodiment of the disclosure. This process comprises physically mixing the active material, conductive additive, and binder together, and coating it directly on a current collector. This example process comprises a direct coating process in which a slurry is directly coated on a metal foil using a binder such as PVDF, CMC, SBR, Sodium Alginate, PAI, Poly(acrylic acid) (PAA), PI, LA133, polyvinyl alcohol (PVA), polyethylene glycol (PEG), Nafion solution, recently reported electronically conductive polymer binders, and mixtures and combinations thereof. Another example process comprising forming the active material on a substrate and then transferring to the current collector is described with respect to FIG. 3.

In step 201, the raw electrode active material may be mixed using a binder/resin (such as PI, PAI), solvent, and conductive carbon. For example, for the cathode, Super P/VGCF (1:1 by weight), or other types carbon materials, such as graphite, graphene, etc., may be dispersed in binder solution (mixture of NMP and PVDF) for 0.5 to 2 minutes at 1500-2500 rpm. NCA cathode material powder may be added to the mixture along with NMP solvent, then dispersed for another 1-3 minutes at 1500-2500 rpm to achieve a slurry viscosity within 2000-4000 cP (total solid content of about 48%). A phthalocyanine-based additive may be mixed in with the slurry at this point, or may be added at a later stage in the process. A similar process may be utilized to mix the active material slurry for the anode.

In step 203, the cathode slurry may be coated on an aluminum foil at a loading of, e.g., 15-35 mg/cm$^2$. Similarly, the anode slurry may be coated on a copper foil at a loading of 3-6 mg/cm$^2$, which may undergo drying in step 205 resulting in less than 13-20% residual solvent content. In another example scenario, a sulfur-based additive may be incorporated by dipping the coated foil in a solution with the desired additive.

In step 207, an optional calendering process may be utilized where a series of hard pressure rollers may be used to finish the film/substrate into a smoother and denser sheet of material.

In step 209, the active material may be pyrolyzed by heating to 500-1200 C such that carbon precursors are partially or completely converted into glassy carbon. Pyrolysis can be done either in roll form or after punching in step 211. If done in roll form, the punching is done after the pyrolysis process. The punched electrode may then be sandwiched with a separator and cathode with electrolyte to form a cell. In step 213, the cell may be subjected to a formation process, comprising initial charge and discharge steps to lithiate the anode, with some residual lithium remaining and cell testing to determine performance.

Figure 3:
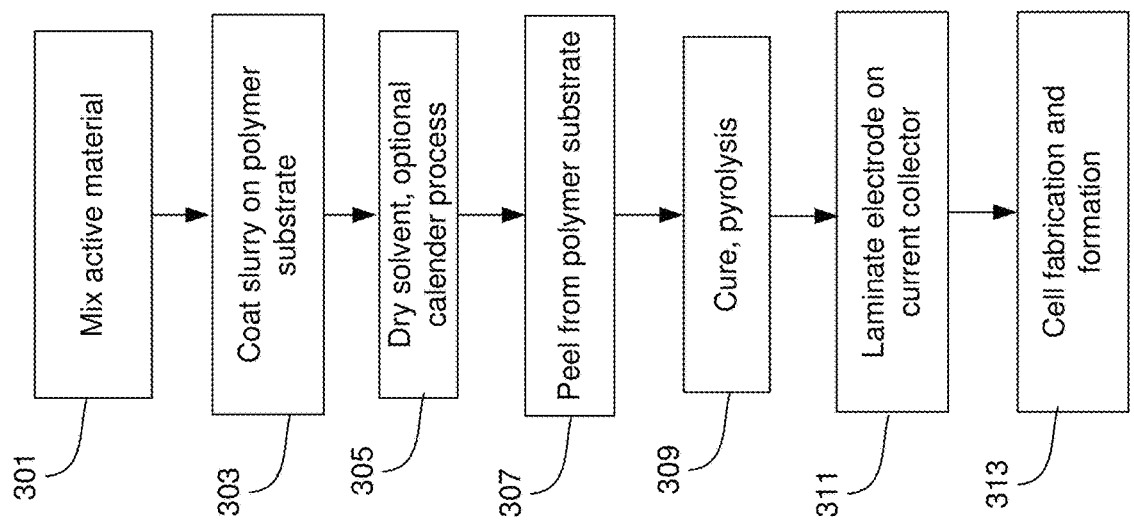
FIG. 3 is a flow diagram of an alternative process for lamination of electrodes, in accordance with an example embodiment of the disclosure.

FIG. 3 is a flow diagram of an alternative process for lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 3, starting with step 301 where the raw electrode active material may be mixed using a binder/resin (such as PI, PAI), solvent, and conductive carbon. For example, for the cathode, Super P/VGCF (1:1 by weight) may be dispersed in binder solution (mixture of NMP and PVDF) for 0.5 to 2 minutes at 1500-2500 rpm. NCM, NCA, Li-rich or other cathode material powder may be added to the mixture along with NMP solvent, then dispersed for another 1-3 minutes at 1500-2500 rpm to achieve a slurry viscosity within 2000-4000 cP (total solid content of about 48%). A phthalocyanine-based additive may be mixed in with the slurry at this point, or may be added at a later stage in the process. A similar process may be utilized to mix the active material slurry for the anode.

In step 303, the slurry may be coated on a polymer substrate, such as polyethylene terephthalate (PET), polypropylene (PP), or Mylar. The slurry may be coated on the PET/PP/Mylar film at a loading of 3-6 mg/cm$^2$ (with 13-20% solvent content) for the anode and 15-35 mg/cm$^2$ for the cathode, and then dried to remove a portion of the solvent in step 305. In another example scenario, a phthalocyanine-based additive may be incorporated by dipping the green layer coated substrate in a solution with the desired additive. An optional calendering process may be utilized where a series of hard pressure rollers may be used to finish the film/substrate into a smoothed and denser sheet of material.

In step 307, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 309 where the film may be cut into sheets, and vacuum dried using a two-stage process (100-140° C. for 14-16 hours, 200-240° C. for 4-6 hours). The dry film may be thermally treated at 1000-1300° C. to convert the polymer matrix into carbon.

In step 311, the pyrolyzed material may be flat press or roll press laminated on the current collector, where for aluminum foil for the cathode and copper foil for the anode may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the active material composite film may be laminated to the coated aluminum or copper using a heated hydraulic press (30-70 seconds, 250-350° C., and 3000-5000 psi), thereby forming the finished composite electrode. In another embodiment, the pyrolyzed material may be roll-press laminated to the current collector. In yet another example scenario, a phthalocyanine-based additive may be incorporated by dipping the coated foil in a solution with the desired additive.

In step 313, the electrodes may then be sandwiched with a separator and electrolyte to form a cell. The cell may be subjected to a formation process, comprising initial charge and discharge steps to lithiate the anode, with some residual lithium remaining, and testing to assess cell performance.

FIGS. 4A-4J illustrate molecular structures of example phthalocyanine additives that may be utilized in cathodes, in accordance with an example embodiment of the disclosure. In an example embodiment of the disclosure, phthalocyanines are added to a cathode slurry as an additive for the unique electrochemical and physicochemical features of phthalocyanines. Referring to FIG. 4A, there is shown Cobalt(II)1,2,3,4,8,9,10,11,15,16,17,18,22,23,24,25-hexadecafluoro-29H,31H-phthalocyanine (Co-Pc-F) that may be incorporated into the cathode slurry, and has a Co metallic center with a fluorine substituted ring structure. The cathode slurry may be prepared by mixing Co-Pc into the slurry mixture, with NCM811, for example, for Ni-rich cathode active material and then cast on an aluminum foil and dried to form cathode electrode.

FIG. 4B illustrates another example where dilithium phthalocyanine (Li-Pc), which has a coordinated structure with two lithium ions, may be introduced as an additive to a NCM811 cathode, for example. The uncoordinated bond of the macrocyclic structure can directly coordinate with the surface of metals in cathode materials. The unique coordination chemistry of Li presence in the structure may improve Li-ion conductivity due to three reasons: (i) Li-ion hopping can contribute to the overall Li-ion conductivity; (ii) a 2D structure can form a layered structure, which facilitates Li-ion transfer; and (iii) uncoordinated bonds in the phthalocyanine structure can scavenge metal ion diffusion towards the anode.

FIGS. 4C-4J illustrate further example materials such as cobalt(II) phthalocyanine (FIG. 4C), nickel(11) phthalocyanine-tetrasulfonic acid tetrasodium salt (FIG. 4D), titanium (IV) phthalocyanine dichloride (FIG. 4E), manganese(II) phthalocyanine (FIG. 4F), zinc phthalocyanine (FIG. 4G), aluminum phthalocyanine chloride (FIG. 4H), Iron(II) phthalocyanine (FIG. 4I), and silicon phthalocyanine dichloride (FIG. 4J). Other phthalocyanine materials not shown may include copper, chromium, vanadium, germanium, aluminum, tungsten, etc. . . . where any suitable metal salt is incorporated in phthalocyanine.

Figure 5:
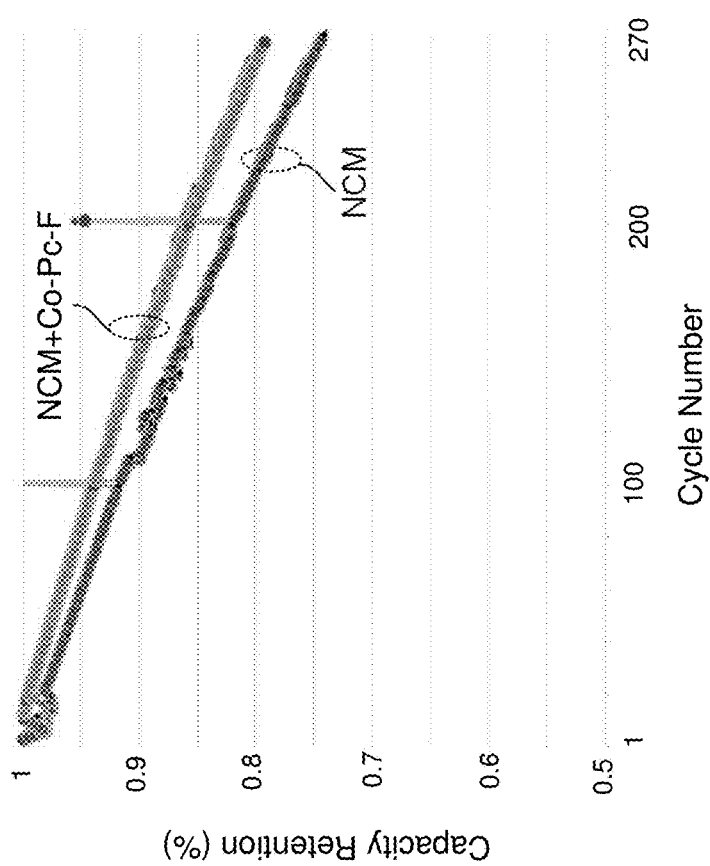
FIG. 5 illustrates cycle life performance of NCM811 vs. NCM811 with 1% Co-Pc-F additive, in accordance with an example embodiment of the disclosure.

FIG. 5 illustrates cycle life performance of NCM811 vs. NCM811 with 1% Co-Pc-F additive, in accordance with an example embodiment of the disclosure. The mixture of NCM811, Co-Pc-F, conductive additive and the binder solution (PVDF) are used to form the cathode slurry. The slurry may then be casted on an aluminum foil and dried to form a cathode electrode. The electrochemical performance of the electrode against high Si content (>80%) anode is shown in FIG. 5 where cycling was conducted at a fast charge rate of 4C and capacity retention was recorded.

As shown in FIG. 5, the Coulombic efficiency of the cell is ~90%, and the cycle life retention is nearly 5% higher for the Co-Pc-F additive cathode as compared to the control NCM811 cathode without additive.

Figure 6:
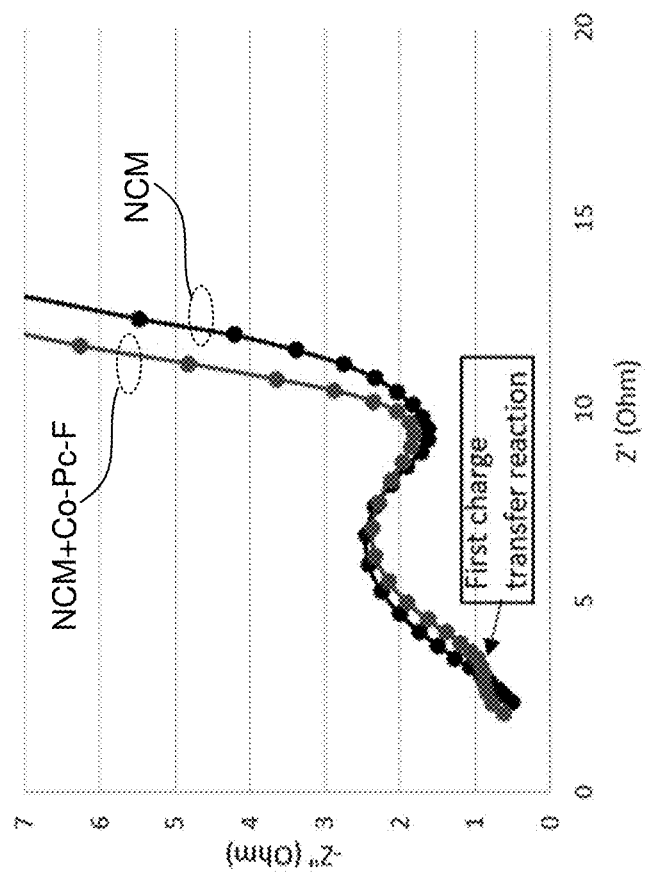
FIG. 6 illustrates cell resistance plots for NCM811 vs. NCM811 cathodes with 1% Co-Pc-F additive, in accordance with an example embodiment of the disclosure.

FIG. 6 illustrates cell resistance plots for NCM811 vs. NCM811 cathodes with 1% Co-Pc-F additive, in accordance with an example embodiment of the disclosure. The plots illustrate Nyquist plots, —Z″ vs Z′, for a cell with Co-Pc-F additive NCM811 cathode (1%) and a control NCM811 cathode cell. The high Coulombic efficiency can be related to the low charge transfer resistance associated with NCM811 cathode that has Co=Pc-F. Initial cell resistance of both cells showed approximately similar values. The cathode with Co-Pc-F clearly showed two semi-circles, which suggests that there are two initial charge transfer reactions. Compared to NCM811, cathode with Co-Pc-F showed ~2Ω of charge transfer resistance, which is significantly lower than NCM811 cathode.

Figure 7:
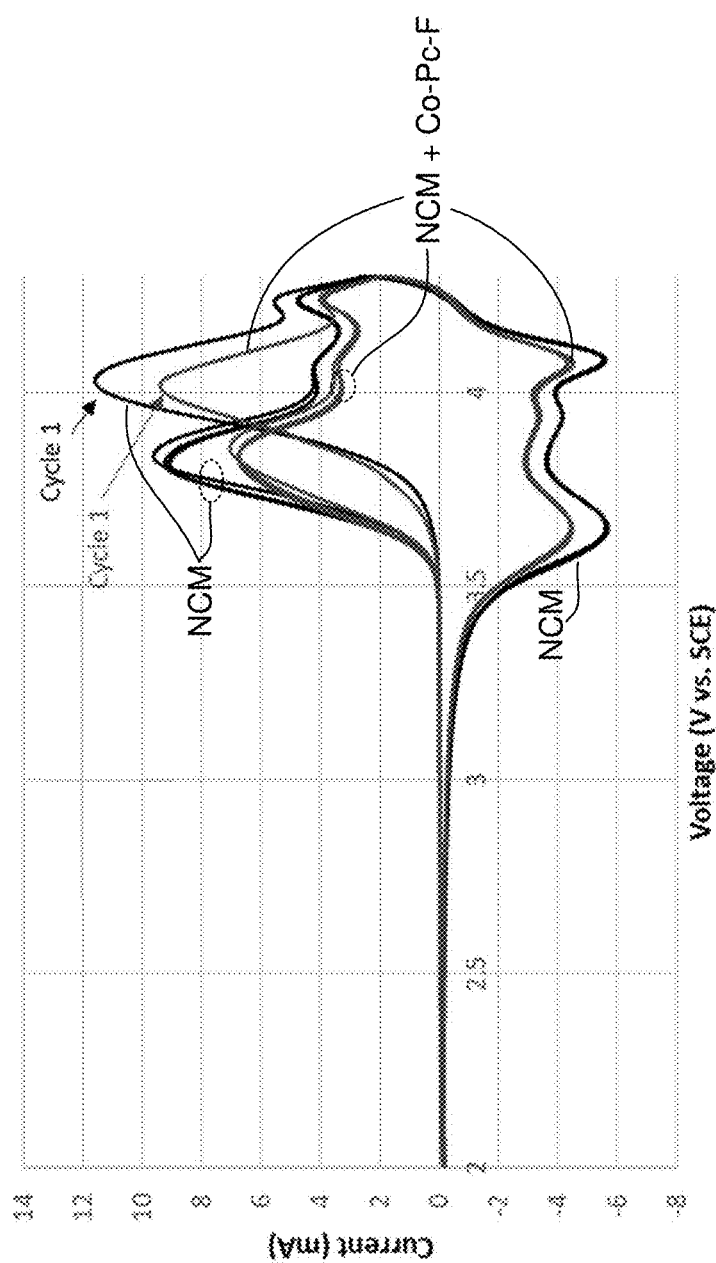
FIG. 7 illustrates cyclic voltammetry curves for control cathodes and for cathodes with 1% Co-Pc-F additive, in accordance with an example embodiment of the disclosure.

FIG. 7 illustrates cyclic voltammetry curves for control cathodes and for cathodes with 1% CoPc-F additive, in accordance with an example embodiment of the disclosure. The cyclic voltammetry (CV) analysis was conducted at a rate of 0.2 mV/s between 2.0-4.3 V window. The plot shows potentials of the anode and cathode with respect to a saturated calomel electrode at different cell current in milliamps.

In the presence of Co salt, the main reduction peaks in CV curves are shifted slightly towards higher potential and the oxidation peaks to lower potentials with an increase in cycle number, indicating reduced polarization of the charging and discharging processes of cells. This may lead to reduced interfacial impedance and enhanced cycling performance, which further confirms the lower charge transfer resistance and improved cycle life with phthalocyanine additive cathodes.

Figure 8:
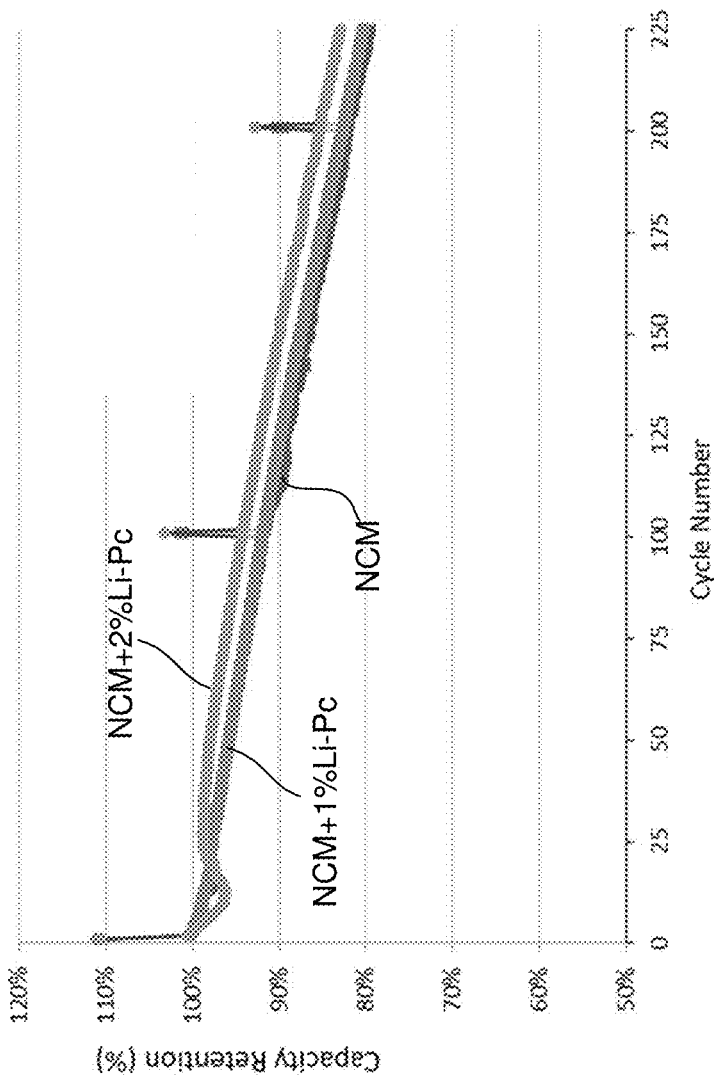
FIG. 8 illustrates cycle life retention plots for cells with dilithium phthalocyanine cathodes and a control cell, in accordance with an example embodiment of the disclosure.

FIG. 8 illustrates cycle life retention plots for cells with dilithium phthalocyanine cathodes and a control cell, in accordance with an example embodiment of the disclosure. Referring to FIG. 8, the 1 wt. % and 2 wt. % additive content cathode cells were tested which resulted in an improvement in cycle life retention of several percent after 225 cycles, where the 2% additive cathode shows the best cycle life retention.

In an example embodiment, the phthalocyanine and metal phthalocyanine (MPc) cathode additives disclosed above may be utilized to improve cycle performance for NCM cathode-based (including NCM811, NCM622, NCM532, NCM111, etc.) full cells with different Si anodes. In another example embodiment, the phthalocyanine and metal phthalocyanine (MPc) cathode additives disclosed above may be utilized to improve cycle performance for NCA cathode-based full cells with different Si anodes.

In yet another example embodiment, the phthalocyanine and metal phthalocyanine (MPc) cathode additives disclosed above may be utilized to improve cycle performance for LCO cathode-based full cells with different Si anodes, $LiMn_2O_4$ (LMO)-based cathodes with different Si anodes, Li-rich, $xLi_2MnO_3 \cdot (1-x)LiNi_aCo_bMn_cO_2$ cathode-based full cells with different Si anodes, Ni-rich layered oxides ($LiNi_{1-x}M_xO_2$, M=Co, Mn, and Al-based Li-ion full cells with different Si anodes, Li-rich layered oxides ($LiNi_{1+x}M_{1-x}O_2$, M=Co, Mn, and Ni)-based Li-ion full cells with different Si anodes, high-voltage spinel oxides ($LiNi_{0.5}Mn_{1.5}O_4$) cathode Li-ion full cells with different Si anodes, and high-voltage polyanionic compounds (phosphates, sulfates, silicates, etc.) cathode-based Li-ion full cells with different Si anodes.

Furthermore, the phthalocyanine and metal phthalocyanine (MPc) cathode additives disclosed above may be incorporated with different anodes including graphite, graphene, or combinations thereof. The electrode may comprise graphene and other types of hard/soft carbon in combination with Si and layered Si materials. In addition, an electrolyte additive may be incorporated into the anode or cathode such that the electrolyte concentration can be maintained at the fully saturated concentration, greater than 1 M, for example. This would be especially helpful for electrolyte additives with low solubility.

The embodiments disclosed above may enable the improved cycle life of high Si content anode//Ni rich cathode full cells, the improved cycle life of Ni- and Mn-rich cathode materials, the mitigation of metal cation dissolution via scavenging the dissolved cations or forming coordination bonds with metals in cathode material, and improve the safety of the cells.

In an example embodiment of the disclosure, a method and system are described for aromatic macrocyclic compounds (phthalocyanines) as cathode additives for inhibition of transition metal dissolution and stable solid electrolyte interphase formation. The battery may comprise an anode, an electrolyte, and a cathode, wherein the cathode comprises an active material and a phthalocyanine additive. The phthalocyanine additive may be coordinated with different metal cationic center and functional groups. In one embodiment, the functional groups may be electrochemically active. In another embodiment, the functional groups may be electrochemically inactive. The active material may comprise one or more of: nickel cobalt aluminum oxide (NCA), nickel cobalt manganese oxide (NCM), lithium iron phosphate (LFP), lithium cobalt oxide (LCO), and lithium manganese oxide (LMO), Ni-rich layered oxides $LiNi_{1-x}M_xO_2$ where M=Co, Mn, or Al, Li-rich $xLi_2MnO_3(1-x)LiNi_aCo_bMn_cO_2$, Li-rich layered oxides $LiNi_{1+x}M_{1-x}O_2$ where M=Co, Mn, or Ni, and spinel oxides $LiNi_{0.5}Mn_{1.5}O_4$.

The phthalocyanine additive may comprise cobalt hexadecafluoro phthalocyanine (Co-Pc-F) or dilithium phthalocyanine (Li-Pc), for example. In another example scenario, the phthalocyanine additive may comprise one or more of: cobalt(II) phthalocyanine, nickel(II) phthalocyanine-tetrasulfonic acid tetrasodium salt, titanium(IV) phthalocyanine dichloride, manganese(II) phthalocyanine, zinc phthalocyanine, aluminum phthalocyanine chloride, Iron(II) phthalocyanine, and silicon phthalocyanine dichloride. An electrolyte additive may be incorporated into the cathode or anode to maintain a desired saturation concentration in the electrolyte during operation. The electrolyte additive may exist in a fully or partially soluble state in the electrolyte. The anode may comprise graphite and/or graphene. The anode may comprise an active material that comprises between 5% to 95% silicon. The battery may comprise a lithium ion battery. The electrolyte may comprise a liquid, solid, or gel.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery comprising:
   an anode, an electrolyte, and a cathode, wherein the cathode comprises an active material and a phthalocyanine additive;
   wherein the active material comprises: nickel cobalt aluminum oxide (NCA); nickel cobalt manganese oxide (NCM); lithium iron phosphate (LFP); lithium cobalt oxide (LCO); lithium manganese oxide (LMO); Ni-rich layered oxides $LiNi_{1-x}M_xO_2$ where M=Co, Mn, or Al; Li-rich $xLi_2MnO_3(1-x)LiNi_aCo_bMn_cO_2$; Li-rich layered oxides $LiNi_{1+x}M_{1-x}O_2$ where M=Co, Mn, or Ni; and/or spinel oxides $LiNi_{0.5}Mn_{1.5}O_4$;
   wherein the anode comprises an active material that comprises between 5% to 95% silicon; and
   wherein the phthalocyanine additive is coordinated with a metal cationic center and functional groups.

2. The battery according to claim 1, wherein the phthalocyanine additive comprises cobalt hexadecafluoro phthalocyanine (Co-Pc-F).

3. The battery according to claim 1, wherein the phthalocyanine additive comprises dilithium phthalocyanine (Li-Pc).

4. The battery according to claim 1, wherein the phthalocyanine additive comprises one or more of: cobalt(II) phthalocyanine, nickel(II) phthalocyanine-tetrasulfonic acid tetrasodium salt, titanium(IV) phthalocyanine dichloride, manganese(II) phthalocyanine, zinc phthalocyanine, aluminum phthalocyanine chloride, Iron(II) phthalocyanine, and/or silicon phthalocyanine dichloride.

5. The battery according to claim 1, wherein the anode further comprises graphite and/or graphene.

6. The battery according to claim 1, wherein the battery comprises a lithium ion battery.

7. The battery according to claim 1, wherein the electrolyte is a liquid.

8. A method of forming a battery, the method comprising:
forming a battery comprising an anode, an electrolyte, and a cathode, wherein the cathode comprises an active material and a phthalocyanine additive;
wherein the active material comprises: nickel cobalt aluminum oxide (NCA), nickel cobalt manganese oxide (NCM), lithium iron phosphate (LFP), lithium cobalt oxide (LCO), and lithium manganese oxide (LMO), Ni-rich layered oxides $LiNi_{1-x}M_xO_2$ where M=Co, Mn, or Al, Li-rich $xLi_2MnO_3(1-x)LiNi_aCo_bMn_cO_2$, Li-rich layered oxides $LiNi_{1+x}M_{1-x}O_2$ where M=Co, Mn, or Ni, and/or spinel oxides $LiNi_{0.5}Mn_{1.5}O_4$; and
wherein the anode comprises an active material that comprises between 5% to 95% silicon; and
wherein the phthalocyanine additive is coordinated with a metal cationic center and functional groups.

9. The method according to claim 8, wherein the phthalocyanine additive comprises cobalt hexadecafluoro phthalocyanine (Co-Pc-F).

10. The method according to claim 8, wherein the phthalocyanine additive comprises dilithium phthalocyanine (Li-Pc).

11. The method according to claim 8, wherein the phthalocyanine additive comprises: cobalt(II) phthalocyanine, nickel(II) phthalocyanine-tetrasulfonic acid tetrasodium salt, titanium(IV) phthalocyanine dichloride, manganese(II) phthalocyanine, zinc phthalocyanine, aluminum phthalocyanine chloride, Iron(II) phthalocyanine, and/or silicon phthalocyanine dichloride.

12. The method according to claim 8, wherein the anode further comprises graphite and/or graphene.

13. The method according to claim 8, wherein the battery comprises a lithium ion battery.

* * * * *